Figure 1:
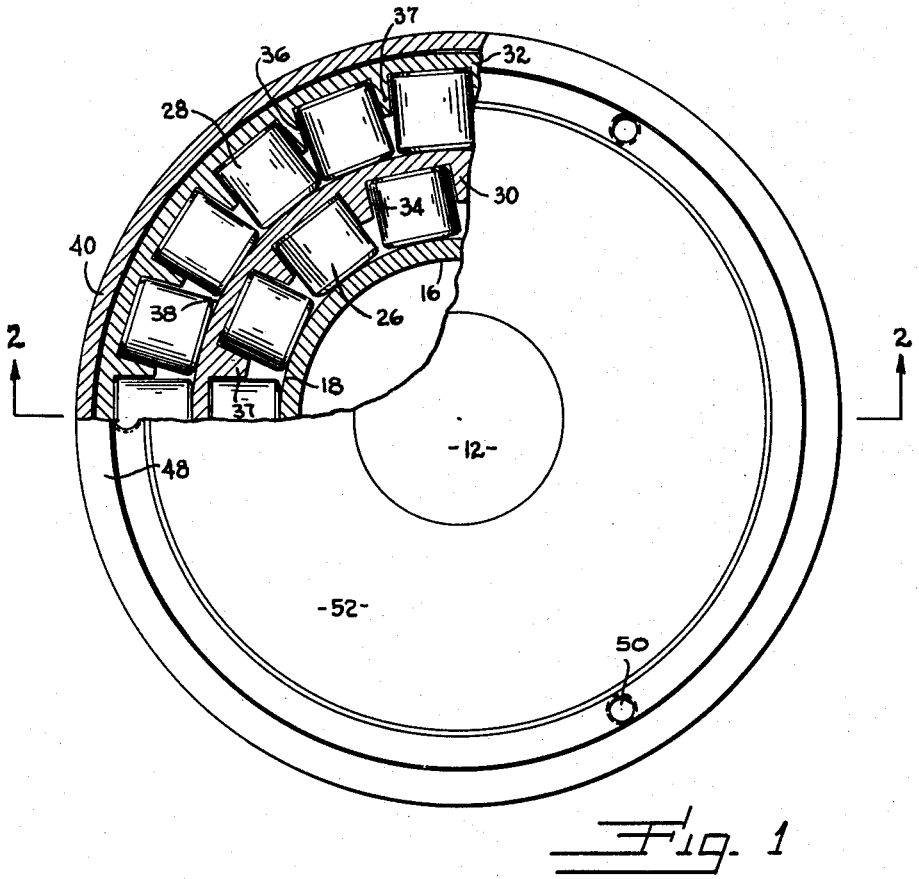

Nov. 8, 1960     H. E. KAYE     2,959,458

THRUST BEARING

Filed Feb. 2, 1959

INVENTOR.
HUBERT E. KAYE
BY D. Emmett Thompson
Attorney

United States Patent Office 2,959,458
Patented Nov. 8, 1960

2,959,458

THRUST BEARING

Hubert E. Kaye, Syracuse, N.Y., assignor to Rollway Bearing Company, Inc., Syracuse, N.Y., a corporation of New York Filed Feb. 2, 1959, Ser. No. 790,524

4 Claims. (Cl. 308—231)

This invention relates to and has as a general object a new and improved thrust bearing.

In certain applications the over-all size of the bearing is limited to a pre-determined size because of space limitations in mounting the bearing. In such applications, where it is desired to have the bearing transmit a maximum load, it is necessary to provide the bearing with the maximum amount of anti-friction members between the top and bottom plates of the bearing.

Accordingly, it is a more specific object of this invention to provide a thrust bearing having a new and improved retaining structure in order to increase the number of anti-friction members, positioned between the top and bottom plates of the bearing whereby to achieve a construction having an increased load capacity for a given size bearing.

The invention consists in the novel features and in the combinations and constructions hereinafter set forth and claimed.

In describing this invention, reference is had to the accompanying drawings in which like characters designate corresponding parts in all the views.

In the drawings—

Figure 2:
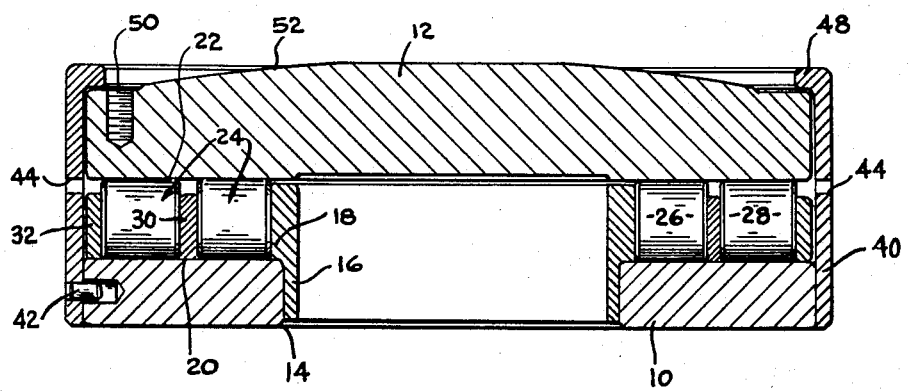

Figure 1 is a top plan view with parts broken away and parts in section of a thrust bearing embodying the invention; and Figure 2 is a cross-sectional view taken approximately on line 2—2 of Figure 1.

Briefly described the invention comprises a bearing having top and bottom plates spaced apart by a plurality of anti-friction members positioned between the plates; the anti-friction members being positioned in radially spaced concentric rows between the top and bottom plates and a plurality of separate movable annular retaining rings serve to retain and guide the rollers between the top and bottom plates.

In the embodiment shown in the drawings, the bearing assembly comprises a bottom plate 10 and a top plate 12. The bottom plate 10 is formed with a central bore 14 and a stationary annular retainer 16 is fixedly mounted in the bore 14 by any suitable means. The upper portion of the retainer 16 is formed with a portion 18 flanged radially outwardly to overlie the top or inner surface 20 of the bottom plate 10 for a purpose to be hereinafter described. Mounted between the inner or bottom face 22 of the upper plate 12 and the top face 20 of the bottom plate 10 are a plurality of anti-friction members, generally indicated at 24, Figure 2. As shown in the drawings, the anti-friction members 24 are rollers but it is to be understood that the anti-friction members may be anti-friction balls, or the like.

The anti-friction members 24 are arranged in a plurality of radially spaced concentric rows, the inner row of rollers being designated by the numeral 26 and the outer row of rollers being designated by the numeral 28 in the embodiment disclosed in the drawings.

A pair of annular retaining members 30 and 32 serve to retain and guide the rows of rollers 26 and 28 between the plates 10 and 12. Each of the retaining members 30 and 32 is formed with a plurality of radially opening notches 34 and 36, formed by radially inwardly extending wedge shaped portions 37. Notches 34 in the retainer 30 receive the outer ends of the rollers 26, and the notches 36 in the retainer 32 serve to receive the outer ends of the rollers 28.

As best seen in Figure 1, the wedge shaped portions 37 of retainers 30 and 32 extend radially inwardly along the periphery of the rollers and terminate short of the axial length of the rollers whereby the inner ends of the rollers are positioned in close proximity to each other. As will be obvious, this retainer construction permits the number of rollers carried by the bearing to be increased over the number of rollers carried in the same size bearing of conventional design wherein the rollers are arranged in end to end abutting relations in radially extending rows positioned in radially extending slots in a retainer disk. In order to provide some material in the disk between the inner ends of the radially disposed rows of rollers, there is considerable spacing between the outer ends of the rows of rollers.

With the arrangement of my invention, the inner ends of the rollers in each circular row are in close proximity, whereby several additional rollers may be incorporated in a bearing of given size.

The inner end faces of the rollers 26 engage and are guided by the outer surface of the flanged portion 18 of the retainer 16 and the outer side surface 38 of the retainer 30 serves to provide an engaging and guide surface for the inner end faces of the rollers 28. As will be obvious, the retainers 30 and 32 are freely mounted between the top and bottom plates and may move relative to each other and to the fixed retainer 16.

As best seen in Figure 1, the inner rollers 26 have an axial length less than the outer row of rollers 28 whereby to keep the amount of relative roller slippage between the inner and outer rows approximately equal. In addition, it will be seen that by reason of the separate retainers 30 and 32, the number of rollers retained in the outer retainer 32 is greater than the number of rollers retained by the inner retainer 30. It is to be understood that, while only two rows of rollers and two separate movable retainers have been shown, the number of rows of concentric rollers and retainers could be increased depending upon the over-all bearing size limitations.

As best seen in Figure 2, the bottom plate 10, inner and outer rows of rollers 26 and 28, and retainers 16, 30 and 32 are all contained within the sleeve member 40. The lower end of the sleeve 40 is affixed to the bottom plate 10 by a plurality of pins 42, and is provided intermediate its axial length with a plurality of lubricant apertures 44 whereby to permit lubricant to be introduced to the rollers mounted between the top and bottom plates. The upper end of the sleeve 40 is formed with an inwardly extending portion or flange 48 which overlies the outer periphery of the upper plate 12 whereby the entire bearing assembly is contained within the sleeve 40. The top plate 12 is formed adjacent its outer periphery with a plurality of threaded apertures 50 designed to receive threaded bolts, or the like, to facilitate the insertion and removal of the bearing assembly from the bearing seat in which the bearing is to be mounted.

The upper surface of the top plate 12 is formed with a curvature as at 52 whereby to make the top plate 12 self-aligning with the thrust member to be applied to the top surface of the plate 12.

It will be seen that by the use of separate retaining members provided with radially opening bearing receiving notches, the number of anti-friction members which can be carried between the top and bottom plates can be increased over the number carried by conventional thrust bearing assemblies. For example, an actual bearing designed in accordance with the embodiment of the invention shown in the drawings and having an over-all diameter of 23.75 inches was provided with 21 rollers in the outer row, each of the rollers having an axial length of 2.50 inches and the inner row of rollers was provided with 14 rollers having an axial length of 2.25 inches, the diameter of all of the rollers being 2.50 inches. The bearing thus designed had a static load capacity of 4,200,000 pounds and, accordingly, the load capacity was increased from 20 to 30 percent over the load capacity of a conventional thrust bearing of the same size.

What I claim is:

1. A thrust bearing comprising a bottom plate, a top plate spaced from said bottom plate by a plurality of anti-friction members positioned in radially spaced concentric rows between said top and bottom plates, and a plurality of separate movable annular retainer rings being cooperable with each other to retain said rows of said anti-friction members between said top and bottom plates, the axial length and the number of said members in each of said concentric rows increasing progressively radially outwardly from the center of said bearing.

2. A self contained screw-down thrust bearing comprising top and bottom plates and a plurality of anti-friction rollers positioned between said plates, said rollers being arranged in a plurality of concentric rows, said bottom plate being formed with a central bore, a stationary annular roller retaining member fixedly positioned in said bore and extending upwardly toward said top plate providing an annular end face engaging surface for the innermost row of rollers, a plurality of movable annular retaining members positioned between the remaining rows of rollers, each of said movable retaining members being formed with a plurality of radially inwardly opening notches, said rollers being received in said notches, the number and axial length of the rollers in said rows increasing progressively radially outwardly from the center of said bearing.

3. A self-contained screw-down thrust bearing according to claim 2, wherein said top plate is formed with a self aligning upper surface and wherein said top and bottom plates, rollers and retainers are contained within a cylindrical sleeve affixed at its lower end to said bottom plate and formed with a flange at its upper end partially overlying said top plate.

4. A thrust bearing comprising top and bottom plates and a plurality of anti-friction rollers positioned between said plates in spaced concentric rows, a separate movable annular retainer for each of said rows, the retainer for each of said rows being formed with a plurality of radially inwardly extending wedge portions whereby a plurality of radially inwardly opening notches are formed in said retainer, the number of said rollers in each of said concentric rows increasing progressively radially outwardly from the center of said bearing, said rollers being received in said notches with said wedges extending axially along the periphery of said rollers and terminating short of the axial length of said rollers whereby the radially inward ends of said rollers are positioned in close proximity to each other.

References Cited in the file of this patent

UNITED STATES PATENTS

| | | |
|---|---|---|
| 955,910 | Sackett | Apr. 26, 1910 |
| 1,141,743 | Wittich | June 1, 1915 |
| 2,017,772 | Schildgen et al. | Oct. 15, 1935 |
| 2,399,669 | Frauenthal | May 7, 1941 |
| 2,499,651 | Kendrick | Mar. 7, 1950 |